United States Patent
Luther et al.

(10) Patent No.: US 11,818,589 B2
(45) Date of Patent: Nov. 14, 2023

(54) THREE-DIMENSIONAL NETWORK PLANNING, EVALUATION, AND OPTIMIZATION

(71) Applicant: Quixotic Holdings, LLC, Fife, WA (US)

(72) Inventors: Ryan Scott Luther, Lakeland, FL (US); Anthony Samuel Jacobs, Olney, MD (US)

(73) Assignee: QUIXOTIC HOLDINGS, LLC, Fife, WA (US)

( * ) Notice: Subject to any disclaimer, the term of this patent is extended or adjusted under 35 U.S.C. 154(b) by 0 days.

(21) Appl. No.: 17/728,557

(22) Filed: Apr. 25, 2022

(65) Prior Publication Data
US 2022/0353148 A1    Nov. 3, 2022

Related U.S. Application Data

(60) Provisional application No. 63/182,564, filed on Apr. 30, 2021.

(51) Int. Cl.
*H04W 16/18*    (2009.01)

(52) U.S. Cl.
CPC .................................. *H04W 16/18* (2013.01)

(58) Field of Classification Search
CPC ... H04W 16/18; H04L 41/0823; H04L 41/145
See application file for complete search history.

(56) References Cited

U.S. PATENT DOCUMENTS

| | | | |
|---|---|---|---|
| 10,178,509 B1 | 1/2019 | Perdew et al. | |
| 10,419,103 B1 | 9/2019 | Perdew et al. | |
| 10,771,326 B2* | 9/2020 | Zhang | H04L 41/145 |
| 2014/0282536 A1* | 9/2014 | Dave | G06Q 30/0631 |
| | | | 718/1 |
| 2015/0188927 A1* | 7/2015 | Santhi | G06Q 10/0631 |
| | | | 726/4 |

* cited by examiner

*Primary Examiner* — Sm A Rahman
(74) *Attorney, Agent, or Firm* — Seed IP Law Group LLP

(57) ABSTRACT

Embodiments described are directed to the evaluation of a dynamically changing communication network environment to ensure that individual participant thresholds and network-centric thresholds are maintained and satisfied. A plurality of conditions for multiple dimensions of data are set for each participant in the network and for the network as a whole. The participant and network conditions, along with the participant capabilities, are considered holistically across the entire network to determine if the network and the participants are meeting thresholds for the different dimensions of data. In various embodiments, the thresholds, either at an individual participant level or at the network level, may be augmented with priorities to ensure that higher priorities are satisfied. The conditions, thresholds, or priorities, or some combination thereof, may be modified throughout the evaluation to improve the satisfaction of the thresholds, which optimize the network by at least one data dimension against at least one threshold.

18 Claims, 8 Drawing Sheets

THREE-DIMENSIONAL NETWORK PLANNING, EVALUATION, AND OPTIMIZATION

BACKGROUND

Technical Field

The present disclosure relates generally to dynamic mobile communication networks, and more particularly to employing a thresholds-based optimization mechanism to ensure individual threshold and network-centric thresholds are satisfied.

Description of the Related Art

Traditional ground-based communication systems include multiple communication nodes at known locations. The capabilities of these nodes and their locations are compared to determine the overall network coverage area. When a node goes down or is unavailable, the network may have an area of missing coverage, which is known based on the capabilities and locations of the remaining nodes. However, determining network coverage in a dynamically changing communication network, such as when using mobile nodes, can be difficult and result in the overall network performance being unsatisfactory. It is with respect to these and other considerations that the following disclosure addresses.

BRIEF SUMMARY

Briefly stated, embodiments described herein are directed to the evaluation and optimization of a dynamically changing communication network environment to ensure, to a select degree of acceptability, that individual participant thresholds and network-centric thresholds are maintained and satisfied. These evaluations and optimizations may be performed as a simulation using pre-planned participant information, as a real-time assessment of network participant performance as individual devices, as a real-time assessment of network participant performance as a collective, as a real-time assessment of overall network performance, or a combination thereof. For example, in some embodiments, an expected network environment (e.g., expected participant capabilities, conditions, thresholds, and priorities) can be used to simulate the network architecture prior to deployment of the participants. In other embodiments, real-time information of the network environment (e.g., actual participant locations, capabilities, conditions, thresholds, and priorities) can be used to determine a current network architecture after deployment of the participants. In yet other embodiments, the current network architecture can be determined and utilized with expected changes in the network environment (e.g., expected changes in participant locations, capabilities, conditions, thresholds, or priorities) to simulate future changes to the current network architecture. These separate evaluations allow for planning, diagnosis and recovery of operational or network health, and overall optimization of the network.

In general, a plurality of conditions for multiple dimensions of data are set for each participant in the network and for the network as a whole. Capabilities of each participant are also determined. The participant and network conditions, along with the participant capabilities, are considered holistically across the entire network to determine if the entire network and the individual participants are meeting a set of thresholds for the different dimensions of data. This analysis can be performed by a central computing system, one or more participants, or as a result of aggregating individual assessments by multiple participants.

In various embodiments, the thresholds, either at an individual participant level or at the network level, may be augmented with priorities to ensure that higher priorities are satisfied. As participants physically move within the network environment, the thresholds may be satisfied at different levels, such as "full," "degraded," or "minimal," depending on the current state of the participants in the network.

The conditions, thresholds, or priorities, or some combination thereof, may be modified and accessed, e.g., by a user selecting specific changes (e.g., in a simulation or planning mode) or from operational network changes (e.g., participant movement or performance), throughout the evaluation process, or from one evaluation to another, to improve the satisfaction of the thresholds, which enables the system to generate a timeline of the network's architecture or to generate operational or network health recovery options.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of embodiments of the present disclosure, reference will be made to the following Detailed Description, which is to be read in association with the accompanying drawings.

DETAILED DESCRIPTION

Figure 1:
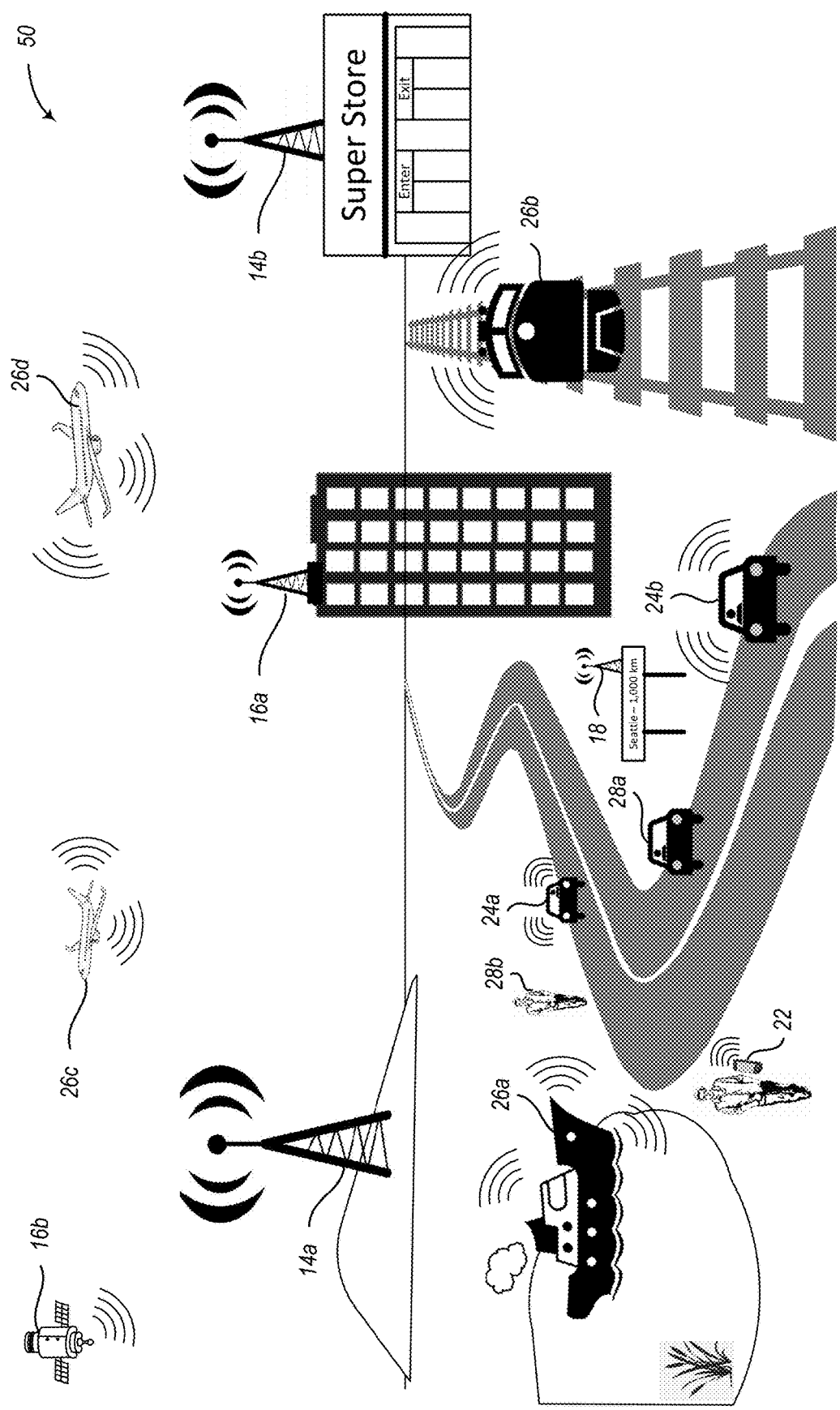
FIG. 1 illustrates a context diagram of an environment for utilizing a three-dimensional network architecture evaluation system to evaluate and optimize a dynamic mobile network in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

As referred to herein, an "object" is a physical thing or item. Examples of objects include, but are not limited to, cars, planes, trains, boats, people, buildings, or other mobile or stationary things. Objects include participant objects and non-participant objects, which can be mobile or stationary. As referred to herein, a "participant" is an object that includes a computing device that can communicate specific, predetermined types of information and data to other participant objects via line-of-sight communications. And as referred to herein, a "non-participant" is an object that does not include a computing device that can communicate the same specific, predetermined types of information and data with a participant object. As discussed in more detail herein, participants can be mobile or stationary and may include computing devices of different sizes having different computing or networking capabilities. Throughout this disclosure, the term "participant" is used interchangeably with "participant object" and "participant computing device" and other related variations, and the term "non-participant" is used interchangeably with "non-participant object" and other related variations.

As referred to herein, "line-of-sight communication" refers to wireless transmission of information from a participant to another participant without other retransmission devices. Accordingly, line-of-sight is the maximum range one participant can communicate wirelessly with another participant without significant data loss. Examples of wireless transmissions used in line-of-sight communications include Bluetooth, Wi-Fi, ADSB, TCAS, or other protocols now known or developed in the future. In some embodiments, all communications between participants utilize a common protocol.

In various embodiments, as referred to herein, "sensor" refers to a participant's utilization of line-of-sight communications to transmit information to another participant or to detect another participant or non-participant object. For example, the sensor may include a transmitter that transmits notification signals or other data via line-of-sight communications to another participant. Notification signals are radio signals that are broadcast or directionally transmitted from a participant to send information to other participants that are within line-of-sight of the transmitting participant. As one example, notification signals may include the participant's identification information, geolocation, kinematic information, throughput capabilities, frequency capabilities, and other information regarding the participant. The sensor can also transmit data signals to other participants. Data signals are radio signals that are broadcast or directionally transmitted from a participant to another participant or computing device to send or forward messages or data packets between participants and computing devices that are in line-of-sight communication with the transmitting participant. The sensor may also include a receiver that receives echo signals of the transmitted notification signals. These echoed notification signals can be utilized to determine a location of an object, which is described in more detail in U.S. patent application Ser. No. 15/892,259, filed Feb. 8, 2018 and issued as U.S. Pat. No. 10,178,509 on Jan. 8, 2019, which is herein incorporated by reference.

Sensors also include beam forming techniques and technologies that enable the sensor to transmit data to or detect objects in a specific sensor coverage area. This specific sensor coverage area is determined based on the beamwidth of the sensor transmissions and a threshold line-of-sight distance of such transmissions. The threshold line-of-sight distance may be determined based on the distance away from the transmission where data loss exceeds a predetermined threshold amount, which may be based on the type of transmitter utilized, power utilization, antenna capabilities, frequency, etc. Sensors may beam form in two dimensions away from a participant or in three dimensions away from the participant. In this way, sensors can be configured to transmit data or detect objects in a specific coverage area next to, in front of, behind, above, or below the participant, or a combination thereof.

In some other embodiments, other types of sensors may also be used, such as infrared, LiDAR, visual spectrum, etc.

FIG. 1 illustrates a context diagram of an environment for utilizing a three-dimensional network architecture evaluation system to evaluate and optimize a dynamic mobile network in accordance with embodiments described herein. FIG. 1 provides an overall example network architecture in which embodiments described herein can be employed. However, other types of mobile networks may also be utilized.

Environment 50 includes a plurality of mobile participants (collectively referred to elsewhere herein as mobile participant computing devices 36), a plurality of stationary participants (collectively referred to elsewhere herein as stationary participant computing devices 34), and a plurality of non-participants (e.g., object 28a-28b). As mentioned above, the participants can communicate specific types of information or data with one another, but cannot communicate the same types of information with the non-participants.

Briefly, each mobile participant employs one or more sensors to communicate with other participants or to detect objects in the vicinity of the participant. A computing device, such as one or more of the mobile participants, a stationary participant, or a server computer or system may track participants and objects by utilizing echoes of self-transmitted notification signals or reflection signals of other participant notification signals. In this way, participants can track objects and transmit data and tracking information to other participants.

The following is a general discussion of the types of participants that may be utilized in such an environment and system. Embodiments, however, are not limited to these particular participants and combinations of participants. For example, in some embodiments, only tier 3 mobile participants (e.g., airplanes) may utilize the sensor coverage management described herein. In other embodiments, for example, a combination of mobile aerial participants and mobile ground participants may be utilized.

The plurality of mobile participants includes tier 1 mobile participants 22, tier 2 mobile participants 24, and tier 3 mobile participants 26. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, or the size, type, or accuracy of the antenna utilized, etc.

For example, tier 1 mobile participants 22 typically have the smallest available power, lowest processing power, smallest bandwidth, shortest ranged antenna, lowest power output, lowest accuracy, and slowest update rate. Examples of tier 1 mobile participants 22 include, but are not limited to, mobile phones, laptop computers, tablet computers, wearable computing devices, or other smaller, low power, low transmission mobile computing or Internet-Of-Things devices. In the example illustrated in FIG. 1, there is only a single tier 1 mobile participant 22, which happens to be a mobile phone in this example. However, other numbers and types of tier 1 mobile participants 22 may also be employed.

Tier 2 mobile participants 24 typically have medium power constraints, a medium amount of processing power, medium bandwidth, medium range capabilities, medium accuracy, and medium update rate. Examples of tier 2 mobile participants 24 include, but are not limited to, automobiles, small personal boats, personal aircrafts, or other medium power, medium transmission, power regenerating mobile computing devices or objects that can support such mobile computing devices. FIG. 1 illustrates example tier 2 mobile participants 24 as including automobiles 24a and 24b. However, other numbers and types of tier 2 mobile participants 24 may also be employed.

Tier 3 mobile participants 26 typically have the largest available power, highest processing power, highest bandwidth, longest transmit and receive capabilities, highest accuracy, and fastest update rate among mobile participant computing devices. Example tier 3 mobile participants 26 include, but are not limited to, commercial airline planes, semi-trucks, cargo ships, trains, or other objects that can support larger, high power, high transmission mobile computing devices or objects that can support such mobile computing devices. FIG. 1 illustrates example tier 3 mobile participants 26 as including boat 26a, train 26b, and airplanes 26c and 26d. However, other numbers and types of tier 3 mobile participants 26 may also be employed.

Various embodiments described herein refer to mobile aerial participants or mobile ground participants. Mobile aerial participants and mobile ground participants are mobile participants. Thus, mobile aerial participants and mobile ground participants may likewise be separated into the three-tiers of participant capabilities.

For example, tier 1 mobile aerial participants may include personal computing devices that are onboard an airplane, such as user devices; tier 2 mobile aerial participants may include general aviation aircraft; and tier 3 mobile aerial participants may include cargo aircraft and commercial aircraft. Tier 1 mobile ground participants may include personal computing devices that are on a person walking down the street or on a car or in a boat; tier 2 mobile ground participants may include automobiles or recreational watercraft; and tier 3 mobile ground participants may include semi-trucks and cargo ships.

In some embodiments, one or more of these tiers may be further separated by capabilities or expected utilization. For example, tier 3 mobile aerial participants may include tier 3A mobile aerial participants that include cargo aircraft and tier 3B mobile aerial participants that include commercial aircraft. One situation where this distinction may occur is where a commercial aircraft is handling a lot of data requests from user devices onboard the aircraft (e.g., tier 1 mobile aerial participants), which may impact that aircraft's throughput for forwarding communications between other participants. Conversely, a cargo aircraft is typically not handling a lot of data requests from user devices onboard the aircraft, but is instead primarily being used to forward communications between other participants.

Although some embodiments may be described herein with respect to mobile aerial participants, embodiments are not so limited. Those same embodiments may instead utilize mobile ground participants or a combination of mobile ground participants and mobile aerial participants, unless the context clearly indicates otherwise.

The plurality of stationary participants includes ground entry points 14, remote entry points 16, and access nodes 18. In some embodiments, stationary participants may be referred to as ground participants. Similar to the three tiers of mobile participants, the ground entry points 14, remote entry points 16, and access nodes 18 are generally separated by computing and networking capabilities, and footprint size in some embodiments.

For example, ground entry points 14 typically have the largest available power, highest processing power, highest bandwidth, and longest range antenna capabilities. Example locations of ground entry points 14 include, but are not limited to, cellular towers, airports, large retail or superstores, or other locations that can support large sized, high power, high transmission stationary computing devices. FIG. 1A illustrates example ground entry points 14 as including tower antenna 14a and superstore 14b. However, other numbers and types of ground entry points 14 may also be employed.

Remote entry points 16 typically have medium power constraints, a medium amount of processing power, medium bandwidth, and medium range capabilities. Example locations of remote entry points 16 include, but are not limited to, restaurants and coffee shops, airfields and train stations, satellites, or other locations that can support medium sized, medium power, medium transmission stationary computing devices. FIG. 1A illustrates example remote entry points 16 as including store antenna 16a and satellite 16b. However, other numbers and types of remote entry points 16 may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As mentioned herein, mobile and stationary participants can communicate with one another to pass information from one participant to another. Although in some embodiments, mobile participants may communicate with one another without the use of stationary participants.

Figure 2:
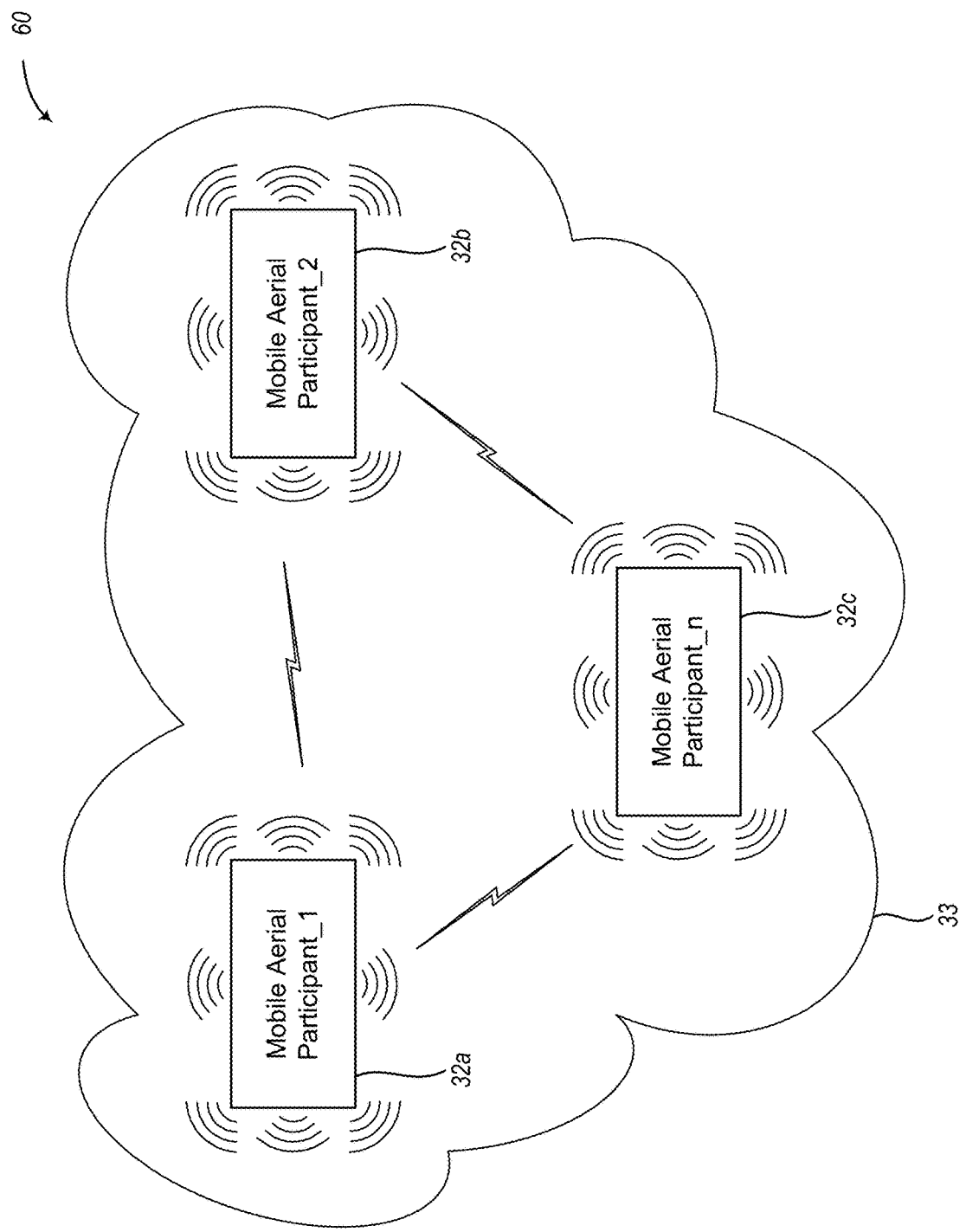
FIG. 2 illustrates a block diagram of a communication network between participants in the dynamic mobile network in accordance with embodiments described herein.

FIG. 2 illustrates a block diagram of a communication network between participants in accordance with embodiments described herein. FIG. 2 illustrates an example 60 of a communication network 33 between a plurality of mobile aerial participants 32a-32c. Collectively, the mobile aerial participants 32a-32c may be referred to as the network. Although FIG. 2 only illustrates three mobile aerial participants as creating network 33, embodiments are not so limited and one or a plurality of mobile aerial participants may be employed. Similarly, the network 33 may be established from other types of mobile participants, including various combinations of tier 1 mobile participants, tier 2 mobile participants, or tier 3 mobile participants, which perform many of the same functions as the mobile aerial participants.

Each mobile aerial participant 32a-32c transmits radio frequency signals to be received by other mobile aerial participants 32 that are within line-of-sight of the sending mobile aerial participant 32. These signals include, but are not limited to (1) data signals that transmit messages or data to another participant and (2) notification signals that provide personalized information regarding the sending mobile participant. In some embodiments, the notification signals are referred to as self-reporting messages or self-reporting signals. The notification signals can include one or both of notification signals for networking and routing among participants and notification signals for safety and de-confliction of possible threats.

The notification signals serve three primary simultaneous purposes: (1) to notify other participants of the sending participant's identity, position, and kinematic information; (2) to detect and track non-participant objects; and (3) to establish routing and network efficiencies (i.e., to create the participant table identifying where each participant is and with who they are in line-of-sight communication). In various embodiments, the notification signals provide individualized information regarding the sending mobile aerial participant 32 so that other mobile aerial participants 32 know that they are within line-of-sight communication of the sending mobile aerial participant 32 within network 33. These notification signals may be referred to as self-reporting signals, since the mobile aerial participant 32 is independently reporting its position and kinematic information to any other mobile aerial participants 32 that are within line-of-sight of the transmitting mobile aerial participant 32 without being prompted or requested by another mobile (or stationary) participant. The mobile aerial participants 32 utilize the notification signals to generate a participant table that is utilized to transmit data signals between the mobile aerial participants 32.

In various embodiments, the information in the notification signal includes the mobile aerial participant's 32 identification information, geolocation, kinematic information, attitude information, throughput capabilities, frequency capabilities, number and capability of sensors, and other information. In various embodiments, the notification signals also include transmission time information that allows for Time Distance of Arrival (TDOA) and Time of Flight (TOF) or Round Trip Timing (RTT) calculations.

The geolocation of the mobile aerial participant 32 may be determined via traditional methods like GPS sensors or modules, cell tower or stationary participant signal triangulation, or via notification messages from other devices or participants that know or estimate the position or location of the mobile aerial participant 32. This can be accomplished with extreme accuracy and minimal latency when notification messages are echoed and supported by stationary participants. The geolocation may also be referred to as the position or location of the mobile aerial participant 32.

The kinematic information may be obtained by monitoring the mobile aerial participant's 32 position and identifying changes over time, utilizing various sensors to calculate or determine the kinematic information, or obtaining it from another system.

The attitude information may be obtained from the electronics or flight controls or sensors of the mobile aerial participant 32. The attitude information may include yaw, pitch, roll, and sensitivity parameters of each.

The frequency capabilities of the mobile aerial participant 32 may be predetermined based on the type of hardware utilized by the mobile aerial participant 32. For example, the hardware of the mobile aerial participant 32 may be designed to utilize ACARS, IEEE 802.11 standards, or some other wireless transmission frequencies or standards, which defines the frequency capabilities of the mobile aerial participant 32. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile aerial participant 32 or on the current processing capacity or network traffic of the mobile aerial participant 32 or a number of other factors. For example, if the mobile aerial participant 32 is a Boeing 737-700 then it may have more throughput capabilities than a Boeing 777-200ER because the Boeing 737-700 may have less passengers and thus may be supporting fewer data requests from user devices onboard the airplane, which can allow for more possessing power to be directed towards forwarding communications between other participants.

The number and capability of sensors may identify the type of sensors, where their particular antennas are attached to the participant, the range/transmission capabilities of the sensors, their beamwidth characteristics, power levels, or other information regarding the sensors on the corresponding participant.

Notification signals are transmitted via directional broadcast beams. In various embodiments, directional notification signals may be transmitted in a sequential or non-sequential 360-degree pattern, so that the notification signal is transmitting in all directions surrounding the participant. In some embodiments, where there is little to no sensor overlap, the notification signals may be transmitted using directional or non-directional broadcast signals. In general, the use of the term "broadcast" herein refers to the transmission of a signal by a sending participant without being requested by another participant and does not have a specific participant as a destination.

Use of directional transmissions can reduce the amount of power needed to transmit the notification signal or other communication to another participant, while also providing additional versatility in providing additional sensor coverage by at least one sensor on at least one participant in an area. Moreover, the use of directional transmissions enables the sending participant to use just enough power to ensure it gets to its intended target. Additionally, directional transmissions can reduce interference between transmissions in a congested space as well as make transmissions more secure.

The notification signal may be broadcast periodically, at predetermined times, dynamically selected based on number and proximity of other mobile aerial participants, or at a given dynamically changing update rate. In some embodiments, the rate at which the mobile aerial participant 32 transmits its notification signal may change based on a combination of the distance, closure velocity, and closing angles between the sending mobile aerial participant 32 and other mobile aerial participants 32 within line-of-sight of the sending mobile aerial participant 32.

The mobile aerial participants 32a-32c transmit notification signals to inform other mobile aerial participants 32 of their position and movement. For example, mobile aerial participant 32a transmits notification signals with information identifying itself and its respective geolocation and kinematic information without regard to the presence or location of mobile aerial participants 32b or 32c. If mobile aerial participant 32c is within line-of-sight of mobile aerial participant 32a, mobile aerial participant 32c receives the transmitted notification signals from mobile aerial participant 32a and utilizes the information in the notification signals, and its own location and kinematic information, to identify the position and movement of mobile aerial participant 32a relative to itself.

The mobile aerial participants 32 can utilize the notification signals to track other participants and non-participants (e.g., by using echo signals of the notification signals to locate objects) and to create and update the participant table to identify which participants are in network 33, their location, their capabilities, and who they are in line-of-sight communication. The various communications between the mobile aerial participants 32a-32c create a communication network 33 among each other that enables them to communicate with one another without the use of another communication backbone, such as a cellular tower network.

The data signals transmitted by one participant to another participant may be transmitted via directional transmission beams or non-directional transmission signals. In various embodiments, the sending mobile aerial participant 32 utilizes a participant table to determine a location of the recipient participant. The sending mobile aerial participant 32 can directionally focus the transmitted data signals towards the recipient participant based on the position of the sending participant and the position of the recipient participant. The use of directional transmissions can reduce power consumption and increase the range in which transmission can be received, while also reducing interference between transmissions in a congested space.

The data signals may be the fusion or combination of payload data and a self-reporting message (similar to the information provided in a notification signal). The size of each data signal may be variable and may dynamically change based on current network bandwidth, individual participant bandwidth, requests for more or less information, requests for higher or lower fidelity tracking of participants or objects, etc. In some embodiments, the amount of payload data may be increased or decreased to accommodate changes in the size of the data signals. In other embodiments, the amount of information in the self-reporting message portion may be increased or decreased to accommodate changes in the size of the data signals. In yet other embodiments, different combinations of increases or decreases to the payload data or the self-reporting message portion may be utilized. In various embodiments, other characteristics of the data signals may be dynamically modified, including changing the pulse width of the transmission beam, changing the energy on the destination participant, etc.

The data signals (or the notification signals) may be packetized for security and ease of transmission (e.g., VOIP or other packetized data-driven services). The data or a portion of the data of each packet may be utilized as a thumbprint of each individual packet. For example, in some embodiments, each packet may include one or more beam characteristics used to transmit the data signal. These beam characteristics can be compared for subsequent packets to determine if the packets originated from the same participant. Similar comparisons of subsequent packets can be performed on other data included in a notification signal (geolocation, kinematic information, attitude information, throughput capabilities, frequency capabilities, number and capability of sensors, etc.).

Although not illustrated, other mobile participants and stationary participants may also perform similar actions as described above to identify and track mobile participants that are in line-of-sight to support management of the participant table and to communicate data or information amongst themselves to increase accuracy and efficiency of each participant.

Figure 3A:
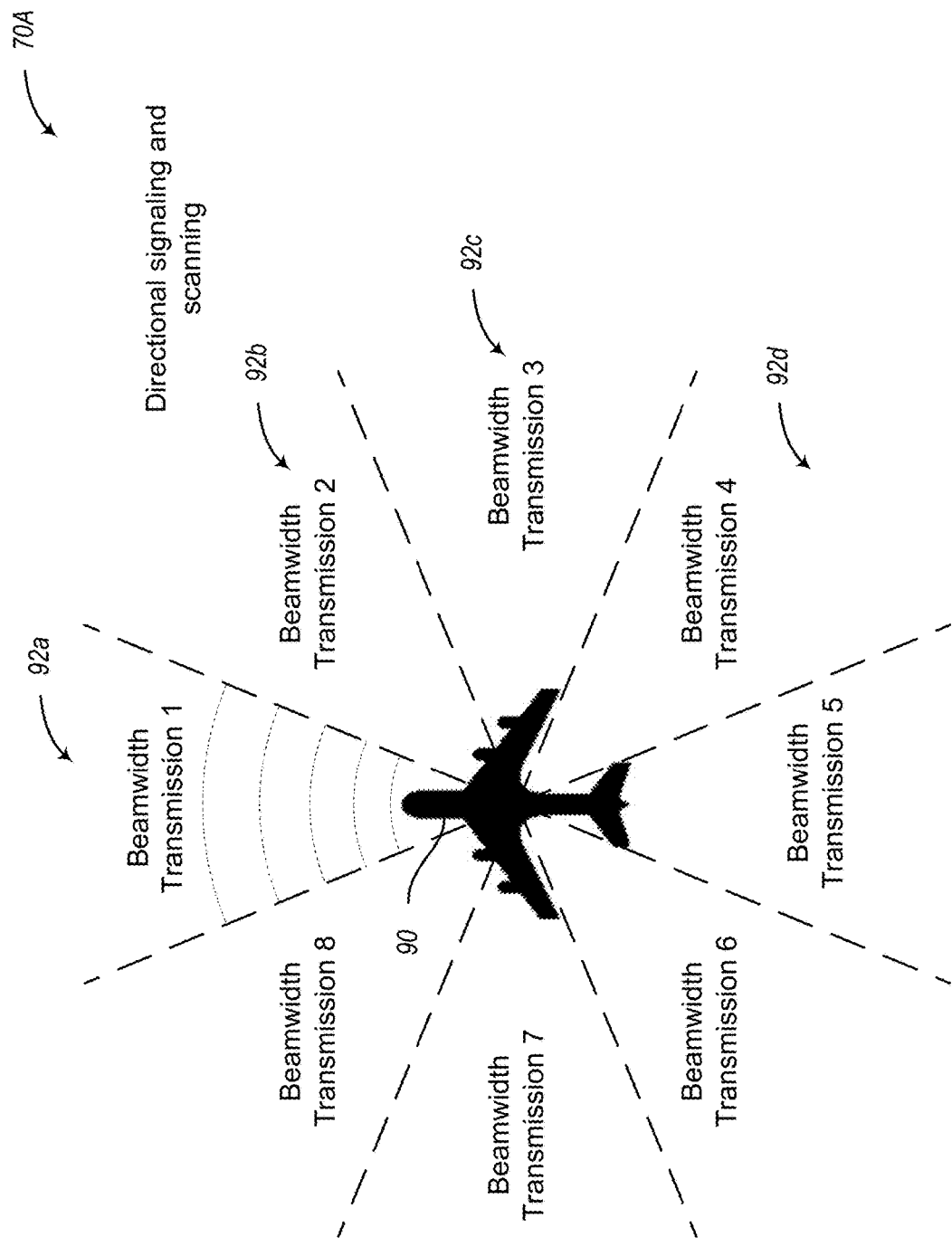
FIGS. 3A-3B illustrate context diagrams of using directional signaling and scanning to provide directional communication between participants in accordance with embodiments described herein.
Figure 3B:
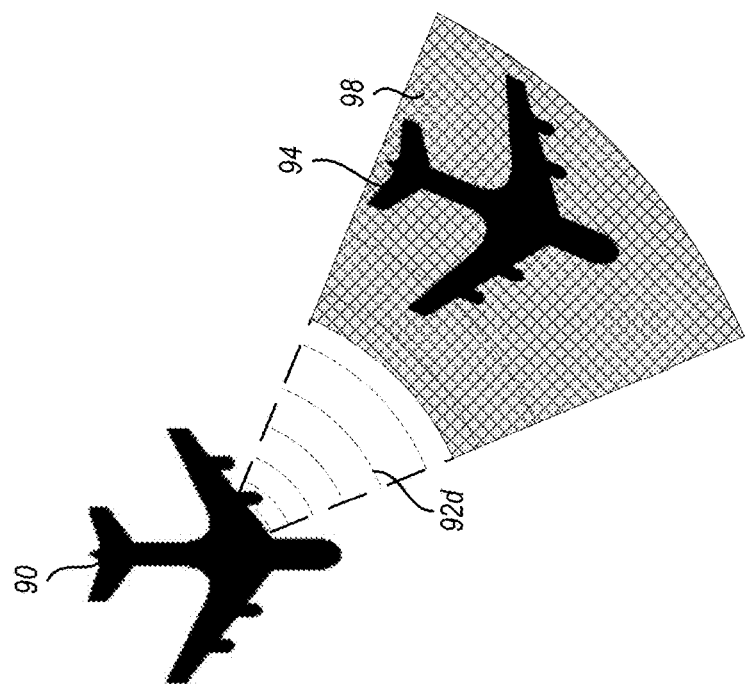

FIGS. 3A-3B illustrate context diagrams of using directional signaling and scanning to provide directional communication between participants in accordance with embodiments described herein. FIG. 3A illustrates an example 70A of first participant 90, such as an airplane, transmitting directional notification signals 92a-92d. As shown, each notification signal 92 is transmitted away from the first participant 90 at a particular angle with a particular beamwidth. In various embodiments, the first participant 90 waits a predetermined amount of time before transmitting the next notification signal 92 at the next angle. In other embodiments, the first participant 90 may continuously transmit the next notification signal at the next angle and utilize phased, frequency, and polarity shifts to allow for simultaneous transmission and reception of notification signals. The beamwidths of the notification signals 92 may not overlap, e.g., as illustrated in FIG. 3A, or they may partially overlap one another.

In the illustrated example in FIG. 3A, the first participant 90 transmits eight notification signals with 45 degree beamwidth to cover 360 degrees around the first participant 90. Although FIG. 3A illustrates the notification signals as two-dimensional transmissions, embodiments are not so limited, and the notification signals may be transmitted as three dimensional signals, such as a cone shape. In some embodiments, the first participant 90 may transmit a first set of notification signals at a first elevation, e.g., with a center of the transmission on a horizontal axis from the first participant, and a second set of notification signals at a second elevation, e.g., with a center of the transmission at a 30 degree angle towards the ground. The first participant 90 may continue with additional sets of notification signals as different vertical or elevational angles to create a three-dimensional coverage area.

In various embodiments, the first participant 90 transmits the notification signals 92 in a sequential order. For example, notification signal 92a is transmitted first, followed by notification signal 92b, which is followed by notification signal 92c, and so on. A complete transmission cycle occurs when all eight notification signals 92 have been transmitted. A complete transmission cycle is used to notify other participants within line-of-sight of the first participant 90 of the first participant's 90 location and kinematic information.

Although FIG. 3A illustrates eight notification signals being used for a complete transmission cycle, other numbers of notification signals at other beamwidths may also be utilized. Moreover, the first participant 90 may include one or a plurality of sensors that each performs such directional notification signals. In at least one such embodiment, each sensor may include a complete transmission cycle that is 360 degrees, 90 degrees, or some other total coverage area. Moreover, a complete transmission cycle may include one or more different planes or levels in a 3-dimensional area around the first participant 90. For example, a given sensor may have a 90 degree horizontal beamwidth area to cover, but also include a positive 45 degrees and negative 45 degrees vertically with respect to the horizon of the first participant 90—although other coverage areas may be employed.

In various embodiments, a complete transmission cycle is performed at a given update rate, which may be predetermined or may dynamically change. For example, in some embodiments, the update rate may be faster when there are more participants or non-participant objects near the first participant 90, compared to when there are few or no objects near the first participant 90. In other embodiments, the update rate may be faster when the first participant 90 is moving at a higher speed compared to when the first participant 90 is moving at a slower speed.

In some embodiments, the first participant 90 may also maintain individualized update rates for each participant that is in line-of-sight of the first participant 90. However, since the first participant 90 does not request the positional information from other participants, it can utilize only the received notification signals based on the update rate, while ignoring every other notification signal from the other participant. For example, if another participant is transmitting notification signals once every second, but the first participant 90 has an update rate of once every five seconds for the other participant, then it may utilize one of the five notification signals that it receives in a five second period while ignoring the rest. This individualized update rate may dynamically change based on the distance and velocity of closure between the first participant 90 and the other participant object. In this way, the first participant 90 utilizes more notification signals from the first participant 90 when the other participant and the first participant 90 are closer together or traveling towards each other such that there is a threat of potential collision, and ignores superfluous notification signals if they are far apart or traveling away from one another. In other embodiments, first participant 90 can use one of its self-reported notification signals to communicate to other participants within line of sight to increase its update rate, if needed.

FIG. 3B illustrates an example 70B of a second participant 94 coming within line-of-sight of the first participant 90 while the first participant 90 is transmitting directional notification signals 92.

As shown in FIG. 3B, the notification signal 92d is transmitted away from the first participant 90. The second participant 94 receives the notification signal 92d. Based on the information in the notification signal 92, the second participant 94 updates the participant table. Likewise, the second participant 94 is also transmitting notification signals, not illustrated, that are being received by the first participant 90.

When the first participant 90 has a message or communication to transmit to the second participant 94, the first participant 90 utilizes the participant table to determine the location and movement of the second participant 94 relative to the location and movement of the first participant 90. The first participant 90 can then directionally transmit a signal (e.g., a data signal), similar to the directional transmission of the notification signal 92d, to the second participant 94 with the message or communication. In general, notification signals are not directed towards a specific participant, but data transmission signals are directed towards a specific participant. In this way, the transmission power can be focused on a relatively narrow beamwidth rather than a non-directional broadcasted message, which improves power utilization and reduces the chance of interception by third parties.

Although not described in detail herein, the first participant 90 can receive an echo signal of the notification signal off the second participant 94 to determine a position of the second participant object 94. The first participant 90 can calculate the approximate distance the second participant 94 is away from the first participant 90 based on the time of flight from the transmission of the notification signal 92d to the receipt of the echo signal, and an approximate direction based on angle of arrival of the echo signal. This approximate distance and direction are used to determine an approximate position 98 of the second participant 94.

Utilization of the echo signal from the notification signal can be helpful in identifying and tracking non-participants. Similarly, such independent determination of the approximate position of the second participant 94 may be utilized if a participant's equipment is malfunctioning and not transmitting notification signals or if the information in its notification signals is not accurate. Thus, this approximated position calculation can be compared to the location information in the notification signals to confirm that the information in the notification signals is accurate.

Figure 4:
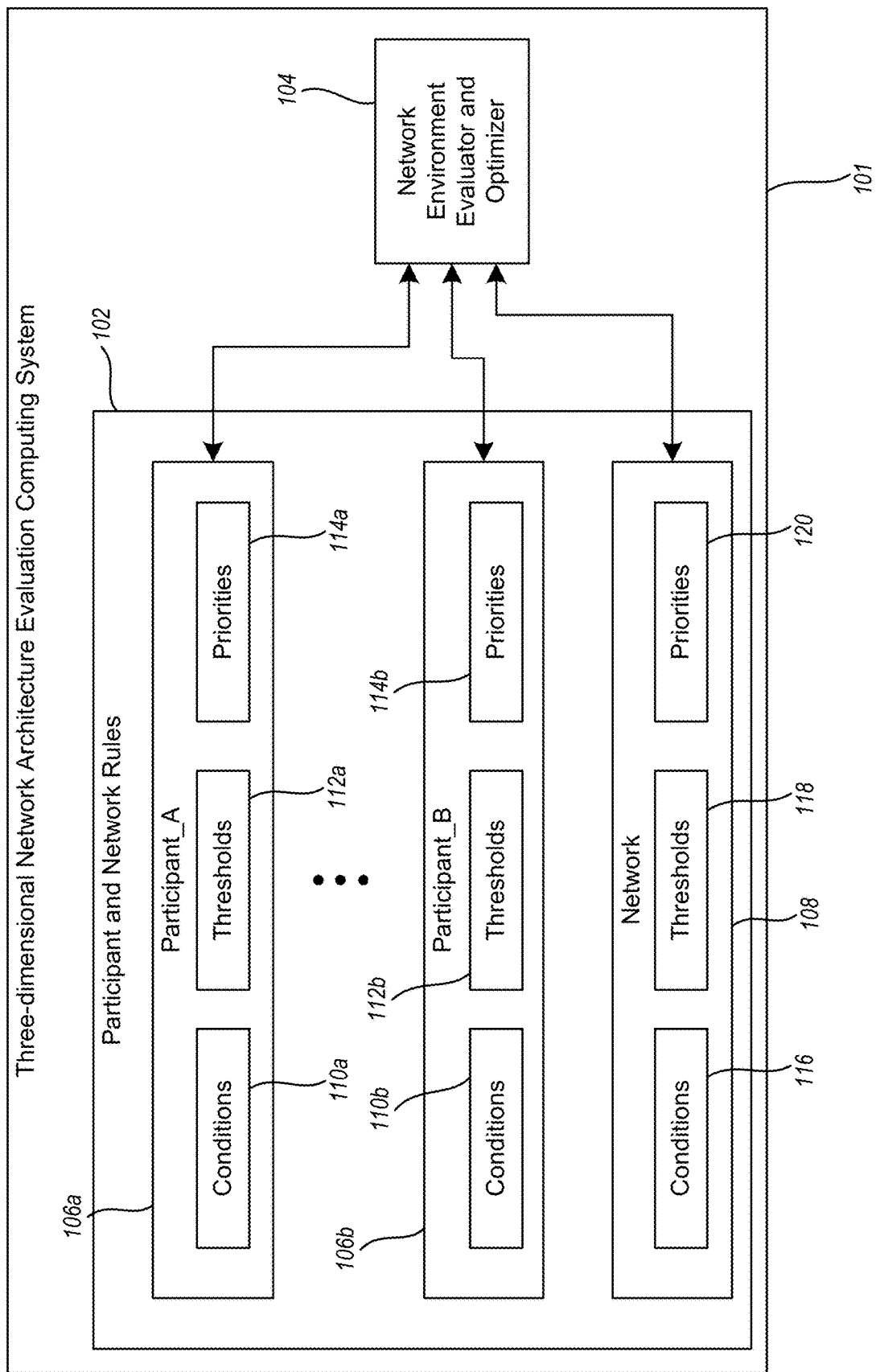
FIG. 4 illustrates a block diagram of a three-dimensional network architecture evaluation system in accordance with embodiments described herein.

FIG. 4 illustrates a block diagram of a three-dimensional network architecture evaluation system 101 in accordance with embodiments described herein. The three-dimensional network architecture evaluation system 101 includes participant and network rules 102 and network environment evaluator and optimizer 104. The participant and network rules 102 include conditions 110, thresholds 112, and priorities 114 for multiple participants 106. Accordingly, conditions 110a and their corresponding thresholds 112a and associated priorities 114a (if applicable) are stored for participant 106a. Similarly, conditions 110b and their corresponding thresholds 112b and associated priorities 114b (if applicable) are stored for participant 106b. Although data from two participants 106 are illustrates as being stored in participant and network rules 102, data from more participants may also be stored.

The participant and network rules 102 also include conditions 116, thresholds 118, and priorities 120 (if applicable) for the network. These conditions 116 and thresholds 118 are at the network-level independent from the individual participants.

The conditions 110, thresholds 112, and priorities 112 of the participants 106 and the conditions 116, thresholds 118, and priorities 120 of the network may be pre-selected or expected values for network architecture simulation purposes, or they may be actual values from the network for current network architecture assessment, or a combination thereof for optimizing future network architecture based on the current architecture.

Moreover, conditions, thresholds, priorities and evaluations may occur at an entire network level, for a portion of a network (instead of an entire network), for a group of multiple participants (rather than at the individual participant level), or for individual participants.

Each participant evaluates its own conditions 110, thresholds 112, and priorities 114 to manage its own available systems to meet its thresholds 112 based on its priorities 114.

Participants of the network 102 can communicate with each other when individual thresholds 112 are not met utilizing internal systems to request assistance in meeting its thresholds 112. In these situations, a requesting participant can provide its required threshold parameters, its system solution specifications, network priority, and other information to other participants that are within line-of-sight of the requesting participant. In some embodiments, the priority is based on network operation requirements to meet sensor acquisition, target tracking, identification, safety, collision avoidance, or some other requirement. In other embodiments, the threshold may also be based on a particular phase of network operation, timeline, network operation or system criteria that has been met or not met as a triggering event. These communications serve as requests to the network for other participants therein to assist in meeting the communicated threshold.

Each other participant that is within line-of-sight sensor coverage of the target or coverage area can assess the received request in relation to its system availability, capability, and current utilization in relation to network priorities. If a participant has system availability and capability available or the priority of the request outweighs its current system utilization, the participant can assist in meeting the threshold by refining the information and calculated error of the request. The assisting participant can transmit the refined information back to the requesting participant. In some situations, other participants within line-of-sight of the assisting participant can receive the refined information and provide additional assistance in further refining the information, if needed to meet the requested threshold. Once the requested threshold is met and the refined information is provided back to the requesting participant, the requesting participant can utilize the refined information to satisfy its thresholds.

Lower priorities like surveillance of the three-dimensional volume of the area-of-operations may be momentarily degraded or paused based on the priority of the request. When this happens, the assisting participant communicates the threshold and priority of the degraded function out into the network and the same assessment as above is conducted. In this way, the network constantly works collectively to meet high priorities and manage systems to maximize effectiveness, while also meeting lower priorities to the maximum abilities of the collective systems.

Network participant system specifications, non-participant system specifications, interference systems, environmental interference and direct system, RF, and network threats can be collected in a network evaluation database that allows the system and environmental characterizations to occur while network participants move through three-dimensional space. This allows the network logic, connectivity, and performance to be evaluated based on the above-mentioned condition 116, thresholds 118 and priorities 120. In live operations, the network can use the actual performance of each system to utilize the same network logic to perform the above actions to manage the network as a collective to meet operational network thresholds based on priority.

The network environment evaluator and optimizer 104 holistically analyzes the conditions 110 of each participant 106 relative to the corresponding thresholds 112 based on their corresponding priorities 114 in combination with the conditions 116, thresholds 118, and priorities 120 for the network. The network environment evaluator and optimizer 104 can dynamically change one or more conditions, thresholds, or priorities of the participants or the network to evaluate changes in the network architecture for different scenarios. These changes may be pre-planned changes, actual changes in the network, or anticipated changes based on the current network. In this way, different phases of network employment can be evaluated prior to deployment of the network, during operational network deployment, or for operational network recovery to detect optimal network performance, efficiency, and effectiveness.

The network environment evaluator and optimizer 104 can perform an initial simulation of the network and then compare it to the actual operational network to detect differences between the behavior of the operational network and the simulation. If the network behavior exceeds some threshold delta from the simulation, then one or more machine learning mechanisms can be used to detect the delta and provide adjustments for future evaluations.

The operation of certain aspects will now be described with respect to FIGS. 5 and 6. In at least one of various embodiments, process 170 described in conjunction with FIG. 5 may be implemented by or executed on one or more computing devices, such as a stationary or mobile participant, and process 200 described in conjunction with FIG. 6 may be implemented by or executed on one or more computing devices, such as three-dimensional network architecture evaluation system 101 in FIG. 1.

Figure 5:
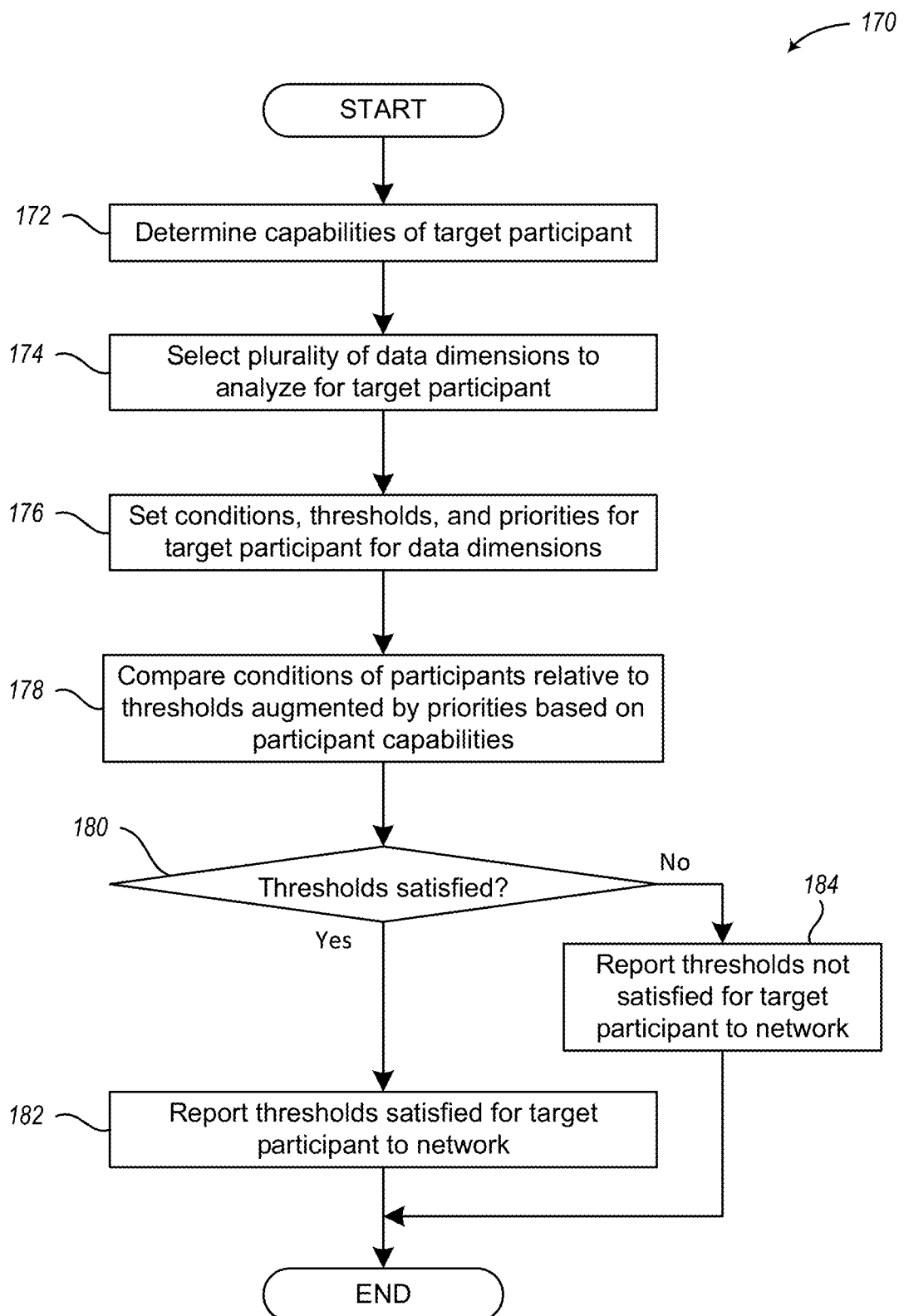
FIG. 5 illustrates a logical flow diagram showing one embodiment of a process for evaluating a participant's performance in a network in accordance with embodiments described herein.

FIG. 5 illustrates a logical flow diagram showing one embodiment of a process for evaluating a participant's performance in a network in accordance with embodiments described herein. As mentioned above, this evaluation may be performed as a simulation using pre-planned participant information or as a real-time assessment of actual participant performance, or a combination thereof.

Process 170 begins, after a start block, at block 172, where the capabilities of a target participant are determined. In various embodiments, the capabilities of the target participant may include, but are not limited to, data throughput capabilities, radio or frequency capabilities, physical movement range of the target participant, maintenance schedules, or other information regarding the operation or functionality of the target participant. In a simulation or pre-planning evaluation, these capabilities are the expected capabilities of the target participant based on known operating characteristics of the target participant. In a real-time assessment of the target participant performance, these capabilities are the actual capabilities being experienced by the target participant. Process 170 continues at block 174, where a plurality of data dimensions are selected for analysis for the target participant. Examples of such data dimensions may include, but are not limited to, one or more of bandwidth, throughput, quality of service, geography, terrain, scenario timeline, atmospheric effects, jamming effects, system timing, system clocks, API-based client data transmissions, connectivity for various services (e.g., internet, communications, etc.), or other information associated with the target participant.

Process 170 proceeds next to block 176, where one or more conditions, thresholds, and priorities are set for the target participant. In various embodiments, the conditions, thresholds, and priorities are set for the selected data dimensions.

In a simulation or pre-planning evaluation, these conditions, thresholds, and priorities are the expected, planned, or desirable conditions, thresholds, and priorities of the target participant. In a real-time assessment of the operational network, these conditions, thresholds, and priorities are the actual conditions, thresholds, and priorities being experienced or employed by the target participant.

The one or more conditions are rules identifying some characteristic associated with the target participant. One example of a condition is "is the target participant within a specific region?" Another example is "does a path to the internet exist from the target participant?" Yet another example is "does target participant have access to a mission target?" These examples are not to be limiting and other conditions may be utilized. In some embodiments, the conditions may be selected based on the type of participant (e.g., mobile or stationary), the capabilities of the target participant, the goals of a network operation associated with the target participant, etc.

The one or more thresholds are indicators or objectives of the conditions. For example, the thresholds may include multiple support levels, such as "full" (the condition is fully satisfied), "degraded" (the condition is not fully satisfied, but within some acceptable tolerance), or "minimal" (the condition is not satisfied, and is outside the acceptable tolerance). Other types of thresholds may also be employed, such as satisfied or not satisfied, a numerical range (e.g., 0 to 10, with 10 being fully satisfied), etc. Moreover, thresholds may be linear, logarithmic, exponential, or some more complex boundary.

The priorities indicate a criticality of the threshold or condition being satisfied. The priorities may be set based on safety, threat avoidance, network coverage provided by the target participant, or other operational network parameters. Examples of priorities may be "low," "medium," and "high," such that the target participant is to satisfy high priority thresholds first, then satisfy medium priority thresholds if able, and finally satisfy low priority thresholds after high and medium thresholds are satisfied. In various embodiments, each condition and threshold includes a priority. In other embodiments, a subset, but not all of the conditions and thresholds include a priority.

In some embodiments, the conditions, thresholds, and priorities may be individualized for the target participant. In other embodiments, one or more conditions, one or more thresholds, or one or more priorities may be defined by or at the network level.

Process 170 proceeds to block 178, where the conditions of the target participant are compared relative to their thresholds and augmented by the priorities. In various embodiments, the participant capabilities and known actions (e.g., actual or estimate position or movement) of the target participant are used to determine if a condition meets a threshold. In various embodiments, the system analyzes multiple conditions from the target participant to determine if the thresholds are satisfied and to what degree. The priorities of the separate conditions and thresholds are also analyzed in combination for the target participant.

Process 170 continues at decision block 180, where a determination is made whether the thresholds are satisfied for their given priorities. In at least one embodiment, this determination is made based on the type of network operation or goals of the network within network operation. For example, in a safety environment, the thresholds may be determined as being satisfied if all high priority safety thresholds are satisfied for the target participant without regard to other lower-priority conditions. In some embodiments, all thresholds must be satisfied for the thresholds to be determined as being satisfied. In other embodiments, a select percentage of the thresholds must be satisfied for the thresholds to be determined as being satisfied. For example, in an internet connectivity setting, if the target participant is experiencing 80% internet access time but only 40% throughput, then the thresholds as a whole may be determined as being not satisfied. Likewise, a select number of standard deviations away from nominal may also indicate the thresholds are being satisfied. In some embodiments, the number of outliers may also be considered.

If the thresholds are satisfied, then process 170 flows to block 182; otherwise, process 170 flows to block 184.

At block 182, the target participant reports its status of having its thresholds satisfied to the network. In some embodiments, the target participant notifies those participants within line-of-sight communication of the target participant. In other embodiments, the target participant notifies a network server, such as three-dimensional network architecture evaluation computing system 101. After block 182, process 170 terminates or otherwise returns to a calling process to perform other actions.

If, at decision block 180, a threshold is not satisfied, then process 170 flows from decision block 180 to block 184. At block 184, the target participant reports its status of having its thresholds not satisfied to the network. Similar to block 182, the target participant may notify those participants within line-of-sight communication of the target participant or it may notify a network server.

In various embodiments, the target network may send a request to other participants for information that may help the target participant satisfy its conditions. For example, if the target participant does not have direct access to a stationary participant for internet access, the target participant may request other participants for information regarding their internet access, such that the other participant may act as an intermediary for the target participant to improve its internet access. As another example, if the target participant is tracking a non-participant object, but it cannot obtain the non-participant object's position within a threshold accuracy, then the target participant may notify other participants and obtain additional information regarding the non-participant object, which may improve the positioning accuracy.

In other embodiments, the target participant may broadcast its status without requesting additional information from other participants. In this case, the target participant may simply notify other participants that one or more thresholds are not satisfied for the target participant. The other participants can then use this information to determine if they satisfy their own thresholds or if one or more network thresholds are satisfied, such as described in conjunction with FIG. 6.

After block 184, process 170 terminates or otherwise returns to a calling process to perform other actions.

In various embodiments, process 170 may loop or be re-executed. In some embodiments, this re-execution may be with the same condition, thresholds, and priorities of the target participant. In other embodiments, one or more conditions, thresholds, or priorities may be updated or changed based on movement of the target participant or changes in the network operations. These changes or updates may be based on simulated changes to the target participant or network operation, or the changes may be based on real-time changes of the target participant or actual network performance, or a combination thereof.

Figure 6:
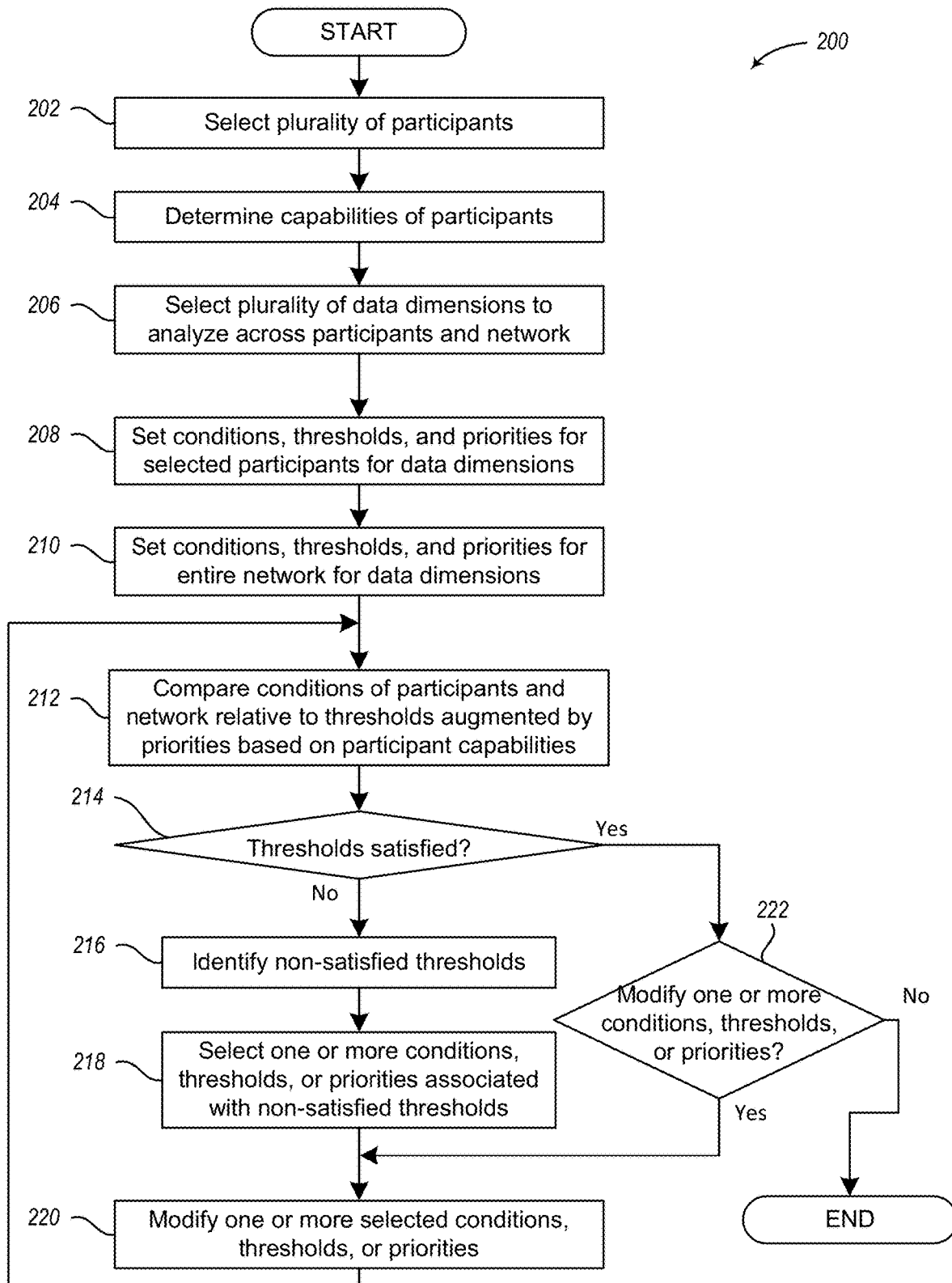
FIG. 6 illustrates a logical flow diagram showing one embodiment of a process for evaluating and optimizing a dynamically mobile network in accordance with embodiments described herein.

FIG. 6 illustrates a logical flow diagram showing one embodiment of a process for evaluating and optimizing a dynamically mobile network in accordance with embodiments described herein. As mentioned above, this evaluation may be performed as a simulation using pre-planned participant information or as a real-time assessment of actual network performance, or a combination thereof.

Process 200 begins, after a start block, at block 202, where a plurality of participants in a network are selected. In various embodiments, the selected participants are only mobile participants. In some embodiments, the selected participants include a combination of mobile and stationary participants.

Process 200 proceeds to block 204, where the capabilities of the selected participants are determined. Similar to block 172 in FIG. 5, the capabilities of the participants may include, but are not limited to, data throughput capabilities, radio or frequency capabilities, physical movement range of the participant, maintenance schedules, or other information regarding the operation or functionality of the participant. In a simulation or pre-planning evaluation, these capabilities are the expected or nominal capabilities of the participants based on known operating characteristics of the participants. In a real-time assessment of the operational network, these capabilities are the actual or current real-time capabilities being experienced by the participants.

Process 200 continues at block 206, where a plurality of data dimensions are selected for analysis across the selected participants and the network. Similar to block 174 in FIG. 5, examples of such data dimensions may include, but are not limited to, one or more of bandwidth, throughput, quality of service, geography, terrain, scenario timeline, atmospheric effects, jamming effects, system timing, system clocks, API-based client data transmissions, connectivity for various services (e.g., internet, communications, etc.), or other information associated with a participant or the network.

Process 200 proceeds next to block 208, where one or more conditions, thresholds, and priorities are set for the plurality of selected participants. In various embodiments, the conditions, thresholds, and priorities are set for the selected data dimensions. In some embodiments, separate participants may have conditions, thresholds, and priorities set for the same, separate, or partially overlapping portions of the selected data dimensions.

In a simulation or pre-planning evaluation, these conditions, thresholds, and priorities are the expected, planned, or desirable conditions, thresholds, and priorities of the participants and the network. In a real-time assessment of the operational network, these conditions, thresholds, and priorities are the actual conditions, thresholds, and priorities being experienced or employed by the participants and the network.

The one or more conditions are rules identifying some operating characteristic associated with the participants or the network. One example of a condition is "is the participant within a specific region?" Another example is "does a path to the internet exist from the participant?" Yet another example is "does participant have access to a mission target?" These examples are not to be limiting and other conditions may be utilized. In some embodiments, the conditions may be selected based on the type of participant, the capabilities of the participant, the goals of network operations associated with the network utilization, etc.

The one or more thresholds are indicators or objectives of the conditions. For example, the thresholds may include multiple support levels, such as "full" (the condition is fully satisfied), "degraded" (the condition is not fully satisfied, but within some acceptable tolerance), or "minimal" (the condition is not satisfied, and is outside the acceptable tolerance). Other types of thresholds may also be employed, such as satisfied or not satisfied, a numerical range (e.g., 0 to 10, with 10 being fully satisfied), etc. Moreover, thresholds may be linear, logarithmic, exponential, or some more complex boundary.

The priorities indicate a criticality of the threshold or condition being satisfied. The priorities may be set for individual participants or at the network level. The priorities may be set based on safety, threat avoidance, network coverage provided by the participant, or other operational network parameters. Examples of priorities may be "low," "medium," and "high," such that a participant is to satisfy high priority thresholds first, then satisfy medium priority thresholds if able, and finally satisfy low priority thresholds after high and medium thresholds are satisfied. In various embodiments, each condition and threshold includes a priority. In other embodiments, a subset, but not all of the conditions and thresholds include a priority.

Process 200 continues next at block 210, where one or more conditions, thresholds, and priorities are set for the entire network for one or more of the selected data dimensions. These conditions, thresholds, and priorities may be associated with or integrated into the participant conditions, thresholds, and priorities, but may also be completely separate.

Process 200 proceeds to block 212, where the conditions of the participants and the network are compared relative to their thresholds and augmented by the priorities. In various embodiments, the participant capabilities and known actions (e.g., actual or estimate position or movement) of the participant are used to determine if a condition meets a threshold. In various embodiments, the system analyzes multiple conditions from multiple participants and the network in combination to determine if the thresholds are satisfied and to what degree. The priorities of the separate conditions and thresholds are also analyzed in combination across the plurality of participants and the network.

Process 200 continues at decision block 214, where a determination is made whether the thresholds are satisfied for their given priorities. This determination can be at the network level, the participant level, or a combination thereof.

In at least one embodiment, this determination is made based on the type of network operation or goals of the network within a mission. For example, in a safety environment, the thresholds may be determined as being satisfied if all high priority safety thresholds are satisfied without regard to other lower-priority conditions. In some embodiments, all thresholds must be satisfied for the thresholds to be determined as being satisfied. In other embodiments, a select percentage of the thresholds must be satisfied for the thresholds to be determined as being satisfied. For example, in an internet connectivity setting, if 80% of participants have access to the internet, then the thresholds as a whole may be determined as being satisfied. Likewise, a select number of standard deviations away from nominal may also indicate the thresholds are being satisfied. In some embodiments, the number of outliers may also be considered.

If the thresholds are satisfied, then process 200 flows to decision block 222; otherwise, process 200 flows to block 216.

At decision block 222, a determination is made whether one or more conditions, thresholds, or priorities is to be modified. In a simulation or pre-planning evaluation, these modifications can be selected based on expected or planned changes that could occur to participants or the network. In a real-time assessment of the operational network, these modifications are based on the actual movement and operation of the participants and the network. In an operational network prediction assessment, these modifications can be selected based on the current operating characteristics of the participants or the network, along with recommended changes to optimize or improve network performance or to rectify operational network health issues.

For example, in some embodiments, the system can modify conditions, such as where the participants are located, to evaluate the network environment over time as participants move. In other embodiments, one or more thresholds or priorities may be modified to evaluate changes in operational network or mission objectives or failures of participants or the network. Moreover, by changing conditions, thresholds, or priorities, the system can predict or assess hazards or errors that may occur within the network, such as participants that are bad actors and need to be removed from the network. If a modification is to be made, then process 200 flows to block 220; otherwise, process 200 terminates or otherwise returns to a calling process to perform other actions.

If, at decision block 214, it is determined that the thresholds are satisfied, then process 200 flows from decision block 214 to block 216. At block 216, the non-satisfied thresholds are identified. For example, if a mission critical threshold is not satisfied, then it is identified. As another example, a participant may be identified as being very far outside bounds for some reason.

Process 200 proceeds to block 218, where one or more conditions, thresholds, or priorities associated with the non-satisfied thresholds are selected. For example, if a particular participant cannot obtain sufficient fidelity in identifying an object, then other participants within some select distance from the particular participant may be selected as being candidates to help improve the fidelity in identifying the object.

In various embodiments, a database of known relationships between conditions, thresholds, and priorities may be maintained and queried based on the non-satisfied thresholds. In other embodiments, one or more artificial intelligence or machine learning mechanisms can be utilized to identify and select associated conditions, thresholds, or priorities.

Continuing the example above of a participant being identified as being very far outside bounds for some reason, other participants that obtain that participant's data could be identified and instructed to ignore its data until corrective action is taken so that the data cannot percolate through the network. Likewise, the other participants can send messages to bring the participant back inside the bounds for the network to recover.

Process 200 continues at block 220, where one or more of the selected conditions, thresholds, or priorities are modified. Continuing the example above of a particular participant being unable to obtain sufficient fidelity in identifying an object, a condition of another participant may change from "is the participant in area_A?" to "is the participant in area_B," where area_B is within line-of-sight communication of the particular participant and the estimated location of the object. In this way, the other participant may be able to provide additional details to help improve the fidelity in identifying the object.

As noted above, the modifications can be based on expected or planned changes that could occur to participants or the network (e.g., in a simulation or pre-planning evaluation), based on the actual movement and operation of the participants and the network (e.g., in a real-time assessment of the operational network), or based on a combination of actual network information and expected or desired changes (e.g., in a real-time assessment and future prediction of the operational network).

After block 220, process 200 loops to block 212 to re-compare the conditions of participants and the network based on the modified conditions, thresholds, or priorities. In this way, process 200 can iteratively assess different combinations of conditions, thresholds, and priorities to evaluate the dynamically changing environment of the network, which can enable the network to find equilibrium while detecting, correcting, and recovering from off-nominal operations or bad actor participants.

As described herein, in some embodiments, process 200 can be implemented in a pre-planning or pre-deployment setting to simulate how the network and participants are to react to different scenarios and operating parameters. In other embodiments, process 200 can be implemented during network operations to monitor how the network and participants are actually operating, which can compared to the pre-deployment simulation. This real-time analysis can be used to identify scenarios that were not predicted or to identify participants that are not operating as expected. In yet other embodiments, process 200 can be implemented during network operations using current operational information and predicted or selected changes to identify scenarios in how to improve, recover, or further optimize the network from its current operations.

The following is one example of how process 200 and embodiments described herein can be used to detect bad actors in the network or to simulate a bad actor and identify how the network recovers. Assume a low-throughput demand participant is transmitting high data rates at a high priority, which is at data rates beyond the thresholds associated with its data priority. The system will honor the requests for a short period because a burst of high-priority data is reasonable for the network to allow. Once the burst threshold is exceeded, the system can simulate or assess corrective actions by modifying the conditions, thresholds, or priorities associated with the participant. For example, the system may begin to associate the participant with a data transmission profile more similar to a high-throughput demand participant. The optimizer can then downgrade the data traffic priority to be more appropriate for data rates that are being sent, and then the overall network health is restored. The participant can be notified that it performed an off-nominal action with administrative consequences (high billing rate, loss of privileges, etc.). In this example, the system can self-correct without resorting to drastic consequences, but repeated abuse can again lead to shunning and further degrading the participant's priorities.

Overall, process 200 can dynamically modify conditions, thresholds, and priorities throughout a scenario, allowing for the evaluation of multiple phases and effective system architectures over time.

Embodiments described herein enable participants and the system to evaluate multiple different aspects of individual participants and the network as a whole. This evaluation may be for a simulated environment or during real-time deployment of the participants and the network. The following are examples of such evaluations:

Evaluation of participant, non-participant, security group, and bad-actor network performance for planning networks and live evaluations of network performance. Employment of embodiments described herein to set and compare conditions, thresholds, and priorities of individual participants or the network can be used to plan network performance with respect to deploying participants, tracking non-participants, utilizing security groups among participants, and detecting bad actor participants or non-participants. The current, real-time conditions, thresholds, and priorities of individual participants or the network can then be used and compared against the planned network performance to determine the accuracy of the planned network or to detect efficiencies or deficiencies in the real-time network performance.

Evaluation of simulated or live radio-frequency environments while in participants are in motion with real-time optimizations or operator recommendations for network optimizations. Employment of embodiments described herein to set and compare conditions, thresholds, and priorities of individual participants or the network can be used to identify and optimize network performance as participants dynamically move with respect to one another. These network optimizations can then be used to provide recommendations to participant operators or to adjust control of autonomous participants.

Evaluation of device performance in the network with self or directed optimizations or reports of sub-optimal performance for a forensic look at device equipment or radio-frequency operating environment. Employment of embodiments described herein to set and compare conditions, thresholds, and priorities of an individual participant can be used or compared against other participant performance or expected performance to determine when the participant is operating at a sub-optimal level. This information can then be used to inform administrators of the degraded performance, inform maintenance workers of a possible hardware or software issue, or to inform an operator to adjust operations or be aware of possible device failures.

Evaluation of device performance in the network with other participants to evaluate and communicate for re-calibration of systems with sub-optimal performance (outside of bounds/thresholds). Employment of embodiments described herein to set and compare conditions, thresholds, and priorities of an individual participant can be used or compared against other participant performance or expected performance to determine when the participant is operating at a sub-optimal level. This information can then be used to re-calibrate or adjust one or more sensors being used by the participant.

Evaluation of device performance in the network with other participants to evaluate and isolate systems or specific system communications with sub-optimal performance (outside of bounds/thresholds) that fall significantly out of bounds or cannot be recalibrated to fall within bounds. Employment of embodiments described herein to set and compare conditions, thresholds, and priorities of an individual participant can be used or compared against other participant performance or expected performance to determine when the participant is operating at a sub-optimal level. This information can then be used to isolate or disable specific systems that are operating sub-optimally and cannot be re-calibrate or adjusted or cannot be re-calibrated or adjusted to an acceptable level.

Evaluation and optimization of individual device's network performance (throughput, latency, access to required databases, etc.) versus their required need (Thresholds) based on location, safety, performance/mission/task requirements (Priorities) at any given time and space. Employment of embodiments described herein to set and compare conditions, thresholds, and priorities of an individual participant can be used to optimize the participant's performance, while maintaining or satisfying participant requirements.

Evaluation of individual network participant's thresholds and priorities versus network requests to meet other's thresholds based on established network priorities. If individual priorities rank higher in network priorities than the network request, then the system will service that request as available based on the network priorities. Employment of embodiments described herein to set and compare conditions, thresholds, and priorities of an individual participant can be used or compared against network requirements or other participant requirements to satisfy both individual participant requirements and network requirements.

All participants within the network or subnetwork continuously communicate to assist each other in meeting their safety, mission or communications thresholds based on the established network priorities for that environment. Artificial intelligence or machine learning algorithms can be trained using historical data on simulated or real-time network information to redefine priorities or thresholds in real-time, or an operator can manually change priorities or thresholds as needed to improve participant or network performance.

Figure 7:
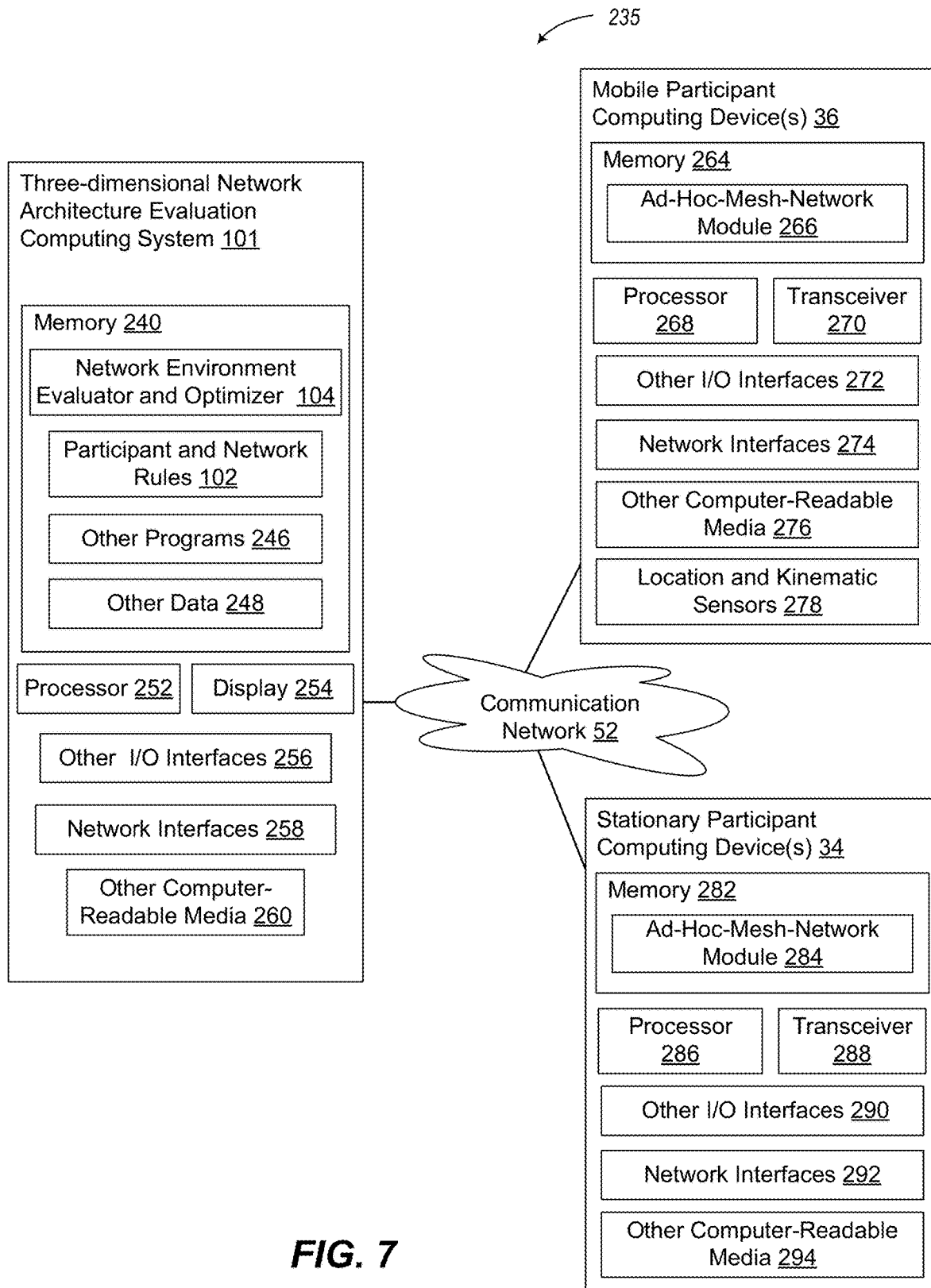
FIG. 7 shows a system diagram that describes one implementation of computing systems for implementing embodiments described herein.

FIG. 7 shows a system diagram that describes one implementation of computing systems for implementing embodiments described herein. System 235 includes the three-dimensional network architecture evaluation computing system 101 of FIG. 4. The three-dimensional network architecture evaluation computing system 101 analyzes conditions, thresholds, and priorities across a plurality of data dimensions for a plurality of participants and their overall network. The three-dimensional network architecture evaluation computing system 101 dynamically modifies conditions, thresholds, or priorities to evaluate different network architectures and environments associated with the participants. In various embodiments, the three-dimensional network architecture evaluation computing system 101 can also utilize real-time data received from mobile participant computing devices 36 and optionally stationary participant computing devices 34 to provide real-time feedback to the network. One or more special-purpose computing systems may be used to implement the three-dimensional network architecture evaluation computing system 101. Accordingly, various embodiments described herein may be implemented in software, hardware, firmware, or in some combination thereof. The three-dimensional network architecture evaluation computing system 101 may include memory 240, one or more processors 252, display 254, other I/O interfaces 256, network interfaces 258, and other computer-readable media 260.

Processor 252 includes one or more processing devices that execute computer instructions to perform actions, including at least some embodiments described herein. In various embodiments, the processor 252 may include one or more central processing units ("CPU"), programmable logic, or other processing circuitry.

Memory 240 may include one or more various types of non-volatile and/or volatile storage technologies. Examples of memory 240 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 240 may be utilized to store information, including computer-readable instructions that are utilized by processor 252 to perform actions, including embodiments described herein.

Memory 240 may have stored thereon network environment evaluator and optimizer 104. The network environment evaluator and optimizer 104 may employ embodiments described herein to analyze a plurality of conditions, thresholds, and priorities within a dynamically changing network to assess network health and evaluate network recovery. The memory 240 also stores participant and network rules 102, which maintains the plurality of conditions, thresholds, and priorities for the entire network and for each of a plurality of participants. The memory 240 may also store other programs 246 and other data 248.

Display 254 is a display interface that is configured to output images, content, or information to a user, such as information regarding the network or the participants. Examples of display 254 include, but are not limited to, LCD screens, LEDs or other lights, or other types of display devices. Other I/O interfaces 256 may include a keyboard, audio interfaces, video interfaces, or the like. Other computer-readable media 260 may include other types of stationary or removable computer-readable media, such as removable flash drives, external hard drives, or the like.

Network interfaces 258 are configured to communicate with other computing devices, such as mobile participant computing devices 36 and stationary participant computing devices 34.

In some embodiments, system 235 may also include mobile participant computing device(s) 36 (e.g., aerial mobile devices), and stationary participant computing device(s) 34.

Mobile participant computing device(s) 36 communicate with one or more other mobile participant computing devices 36 and stationary participant computing devices 34 via line-of-sight communications to transmit data and other communications among the participants. One or more special-purpose computing systems may be used to implement each mobile participant computing device 36. Accordingly, various embodiments described herein may be implemented in software, hardware, firmware, or in some combination thereof. A mobile participant computing device 36 may include memory 264, one or more processors 268, transceiver 270, other I/O interfaces 272, network interfaces 274, other computer-readable media 276, and location and kinematic sensors 278.

The memory 264, processor 268, other I/O interfaces 272, network interfaces 274, and other computer-readable media 276 may be similar to, include similar components, or incorporate embodiments of memory 240, processor 252, other I/O interfaces 256, network interfaces 258, and other computer-readable media 276 of the three-dimensional network architecture evaluation system 101, respectively.

Memory 264 may have stored thereon ad-hoc-mesh-network module 266, which may employ embodiments described herein to track objects, including other participants and non-participants. Transceiver 270 may be an omni-directional transceiver that sends and receives radio signals independent of direction, or transceiver 270 may be a directional transceiver that sends or receives, or both sends and receives, radio signals to or from a particular direction relative to the positioning of the mobile participant computing device 36.

Location and kinematic sensors 278 include one or more sensors that are used to determine the position of the mobile participant computing device 36 and the kinematic information of how the mobile participant computing device 36 is moving. Examples of location and kinematic data sensors 278 include, but are not limited to using participant's self-reported notifications calibrated off of stationary participants, processing the echo of participant's own self-reported notifications, GPS modules, accelerometers, gyroscopes, or other sensors that can be used to determine the position and kinematic information of the mobile participant computing device 36.

Stationary participant computing device(s) 34 communicate with mobile participant computing devices 36 via line-of-sight communications and with other stationary participants either by wired or wireless communications to transmit information or data to other participants or to non-participants. One or more special-purpose computing systems may be used to implement each stationary participant computing device 34. Accordingly, various embodiments described herein may be implemented in software, hardware, firmware, or in some combination thereof. A stationary participant computing device 34 may include memory 282, one or more processors 286, transceiver 288, other I/O interfaces 290, network interfaces 292, and other computer-readable media 294.

The memory 282, one or more processors 286, transceiver 288, other I/O interfaces 290, network interfaces 292, and other computer-readable media 294 may be similar to, include similar components, or incorporate embodiments of memory 264, processor 268, transceiver 270, other I/O interfaces 272, network interfaces 274, and other computer-readable media 276 of the mobile participant computing device 26, respectively. Memory 282 may have stored thereon ad-hoc-mesh-network module 284, which may employ embodiments described herein to transfer data from one participant to another participant.

The various embodiments described above can be combined to provide further embodiments. These and other changes can be made to the embodiments in light of the above-detailed description. Moreover, additional details and use case examples are provided in the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 15/892,259, filed Feb. 8, 2018, entitled "Object Tracking Using A Cognitive Heterogeneous Ad Hoc Mesh Network;" Provisional Patent Application No. 62/467,572, filed Mar. 6, 2017, entitled "Scatternet: A cognitive heterogeneous ad hoc mesh data/cellular/Wi-Fi network establishment/access points/connected devices through utilization of software applications exploiting existing technologies and frequency spectrum for data and voice communications through the exploitation of the Internet and Internet of Things, resulting in the creation of Data communications Adaptive RADAR (DATAR);" and U.S. patent application Ser. No. 15/913,612, filed Mar. 6, 2018, entitled "Cognitive Heterogeneous Ad Hoc Mesh Network;" which are incorporated herein by reference, in their entirety.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   selecting, by a computing device, a plurality of participants of a network;
   determining, by the computing device, capabilities of each of the plurality of participants;
   selecting, by the computing device, a plurality of data dimensions;
   for each corresponding data dimension of the plurality of data dimensions:
      for each corresponding participant of the plurality of participants:
         setting, by the computing device, a participant condition, a participant threshold, and a participant priority for the corresponding participant for the corresponding data dimension; and
         determining, by the computing device, if the participant threshold for the corresponding data dimension for the corresponding participant is satisfied based on a comparison of the participant condition relative to the participant threshold augmented by the participant priority for the corresponding data dimension for the corresponding participant based on the capabilities of the corresponding participant;
      setting, by the computing device, a network condition, a network threshold, and a network priority for the network for the corresponding data dimension; and
      determining, by the computing device, if the network threshold for the corresponding data dimension is satisfied based on a comparison of the network condition relative to the network threshold augmented by the network priority for the corresponding data dimension based on the capabilities of the plurality of participants; and
   modifying, by the computing device, at least one participant condition, participant threshold, or participant priority of one or more of the plurality of participants in response to at least one network threshold or at least one participant threshold not being satisfied for at least one data dimension of the plurality of data dimensions to optimize the network for the at least one data dimension.

2. The method of claim 1, wherein determining the capabilities of each of the plurality of participants includes:
   obtaining, by the computing device, expected operating capabilities of each of the plurality of participants.

3. The method of claim 1, wherein determining the capabilities of each of the plurality of participants includes:
   obtaining, by the computing device, current real-time operating capabilities of each of the plurality of participants.

4. The method of claim 1, wherein setting the participant priority for the corresponding participant for the corresponding data dimension includes:
   obtaining, by the computing device, an individual priority for the corresponding participant indicating a criticality of one or more thresholds or one or more conditions being satisfied for the corresponding participant.

5. The method of claim 1, wherein setting the network priority for the corresponding data dimension includes:
   obtaining, by the computing device, a network-level priority for the corresponding data dimension indicating a criticality of the network threshold for the corresponding data dimension or the network condition for the corresponding data dimension being satisfied for the network.

6. The method of claim 1, wherein setting the participant condition for the corresponding participant for the corresponding data dimension includes:
   obtaining, by the computing device, an individual condition for the corresponding participant wherein the individual condition includes one or more rules identifying one or more operating characteristics for the corresponding participant.

7. The method of claim 1, wherein setting the network condition for the corresponding data dimension includes:
   obtaining, by the computing device, a network-level condition for the corresponding data dimension that set one or more rules for identifying one or more operating characteristics for the network.

8. The method of claim 1, further comprising:
   determining, by the computing device, the capabilities of a target participant;
   setting, by the computing device, the participant conditions, the participant thresholds, and the participant priorities for the target participant for the plurality of data dimensions;
   determining, by the computing device, a status of the target participant by comparing the participant conditions relative to the participant thresholds augmented by the participant priorities for the plurality of data dimensions based on the capabilities of the target participant; and
   notifying at least one other participant of the plurality of participants in the network of the target participant's status.

9. A computing device comprising:
   a memory that stores computer instructions;
   a processor that executes the computer instructions to:
      select a plurality of participants for a simulated network;
      determine capabilities of each of the plurality of participants;
      select a plurality of data dimensions;
      for each corresponding data dimension of the plurality of data dimensions:
         for each corresponding participant of the plurality of participants:
            set a participant condition, a participant threshold, and a participant priority for the corresponding participant for the corresponding data dimension;
            determine if the participant threshold for the corresponding data dimension for the corresponding participant is satisfied based on a comparison of the participant condition relative to the participant threshold augmented by the participant priority for the corresponding data dimension for the corresponding participant based on the capabilities of the corresponding participant;
         set a network condition, a network threshold, and a network priority for the simulated network for the corresponding data dimension; and
         determine if the network threshold for the corresponding data dimension is satisfied based on a comparison of the network condition relative to the network threshold augmented by the network priority for the corresponding data dimension based on the capabilities of the plurality of participants; and
      modify at least one participant condition, participant threshold, or participant priority of one or more of the plurality of participants in response to at least one network threshold or at least one participant threshold not being satisfied for at least one data dimension of the plurality of data dimensions to optimize the simulated network for the at least one data dimension.

10. The computing device of claim 9, wherein the processor determines the capabilities of each of the plurality of participants by further executing the computer instructions to:
obtain expected operating capabilities of each of the plurality of participants.

11. The computing device of claim 9, wherein the process determines the capabilities of each of the plurality of participants by further executing the computer instructions to:
obtain current real-time operating capabilities of each of the plurality of participants.

12. The computing device of claim 9, wherein the process sets the participant priority for the corresponding participant for the corresponding data dimension by further executing the computer instructions to:
obtain an individual priority for the corresponding participant indicating a criticality of one or more thresholds or one or more conditions being satisfied for the corresponding participant.

13. The computing device of claim 9, wherein the processor sets the network priority for the corresponding data dimension by further executing the computer instructions to:
obtain a network-level priority for the corresponding data dimension indicating a criticality of the network threshold for the corresponding data dimension or the network condition for the corresponding data dimension being satisfied for the simulated network.

14. The computing device of claim 9, wherein the sets the participant condition for the corresponding participant for the corresponding data dimension by further executing the computer instructions to:
obtain an individual condition for the corresponding participant, wherein the individual condition includes one or more rules identifying one or more operating characteristics for the corresponding participant.

15. The computing device of claim 9, wherein the processor sets the network condition for the corresponding data dimension by further executing the computer instructions to:
obtain a network-level condition for the corresponding data dimension that set one or more rules for identifying one or more operating characteristics for the network.

16. The computing device of claim 9, wherein the processor further executes the computer instructions to:
determine the capabilities of a target participant;
set the participant conditions, the participant thresholds, and the participant priorities for the target participant for the plurality of data dimensions;
determine a status of the target participant by comparing the participant conditions relative to the participant thresholds augmented by the participant priorities for the plurality of data dimensions based on the capabilities of the target participant; and
notify at least one other participant of the plurality of participants in the network of the target participant's status.

17. A non-transitory processor-readable storage medium having contents stored thereon that, when executed by one or more processors, cause the one or more processors to perform actions, the actions comprising:
identifying a plurality of participants of a network;
determining current capabilities of each of the plurality of participants;
selecting a plurality of data dimensions;
determining current participant conditions, current participant thresholds, and current participant priorities for the plurality of participants for the plurality of data dimensions;
determining a current architecture of the network based on a comparison of the current participant conditions relative to the current participant thresholds augmented by the current participant priorities for the plurality of data dimensions based on the current capabilities of the plurality of participants;
determining at least one threshold not being satisfied by the current architecture;
setting at least one expected participant condition, expected participant threshold, or expected participant priority for at least one of the plurality of participants for at least one of the plurality of data dimensions based on the at least one threshold not being satisfied; and
determining an expected architecture of the network based on a comparison of the current architecture and the at least one expected network conditions, expected network threshold, or expected network priority to optimize the network by the at least one data dimension against the at least one threshold.

18. The non-transitory processor-readable storage medium of claim 17, wherein the execution of the contents by the one or more processors cause the one or more processors to perform further actions, the further actions comprising:
determining the current capabilities of a target participant;
determining the current participant conditions, the current participant thresholds, and the current participant priorities for the target participant for the plurality of data dimensions;
determining a status of the target participant by comparing the current participant conditions relative to the current participant thresholds augmented by the current participant priorities for the plurality of data dimensions based on the current capabilities of the target participant; and
notifying at least one other participant of the plurality of participants in the network of the target participant's status.

* * * * *